May 4, 1948.     E. J. TOEPFER     2,441,045
LAWN MOWER SHARPENER
Filed Aug. 9, 1945     2 Sheets-Sheet 2

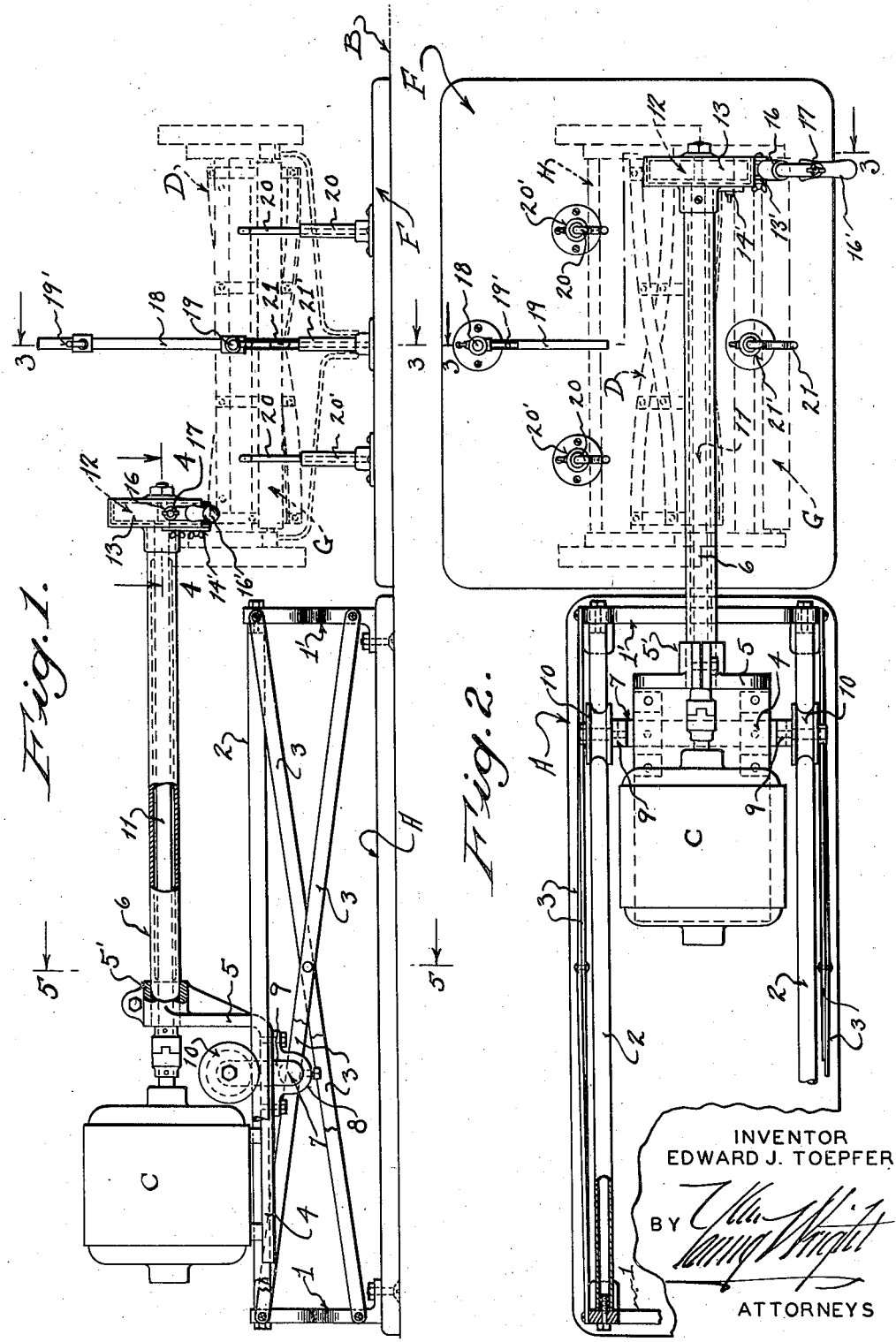

INVENTOR
EDWARD J. TOEPFER
BY
ATTORNEYS

Patented May 4, 1948

2,441,045

UNITED STATES PATENT OFFICE 2,441,045

LAWN MOWER SHARPENER

Edward J. Toepfer, Milwaukee, Wis.

Application August 9, 1945, Serial No. 609,848

2 Claims. (Cl. 51—34)

My invention has for its primary object to provide a simple, economical and effective grinding machine for lawn mowers or the like, the construction and arrangement being such that an operator unskilled in the art may sharpen a mower, having the highest grade finish, without previous knowledge in the trade.

Another object of my invention is to provide a lawn mower sharpening machine, the units of which can readily be dismounted, with relation to each other, and nested in a compact area, whereby the mechanism can be transported from place to place, for the purpose of obtaining sharpening orders, at their various locations of use, it being noted that the knock-down and assemblage operation of the various parts is accomplished without manipulation of bolts or other locking assemblage means.

Another and important object of my invention is to provide a carriage upon which is mounted a motor driven extended shaft carrying a grinder wheel, the same being balanced with relation to the carriage rollers, whereby the grinder may be readily manipulated for engagement with the spiral knives of a lawn mower, the carriage being adapted to travel back and forth to permit the grinder wheel to perform a sharpening operation upon each spiral knife.

A still further object of my invention is to provide the overhung balanced motor driven shaft and grinder wheel supported upon a table and associated with a detachable bed, with adjustable supports for a lawn mower, whereby the blades thereof are correctly positioned for a sharpening operation and the mower supports are capable of manipulating the mower for oiling or other repair work that may be necessary.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 represents a side elevation of a grinder machine embodying the features of my invention and illustrating, in dotted lines, a lawn mower set for a grinding or sharpening operation, parts being broken away and in section to more clearly illustrate structural features.

Figure 2 is a plan view of the same.

Figure 3:
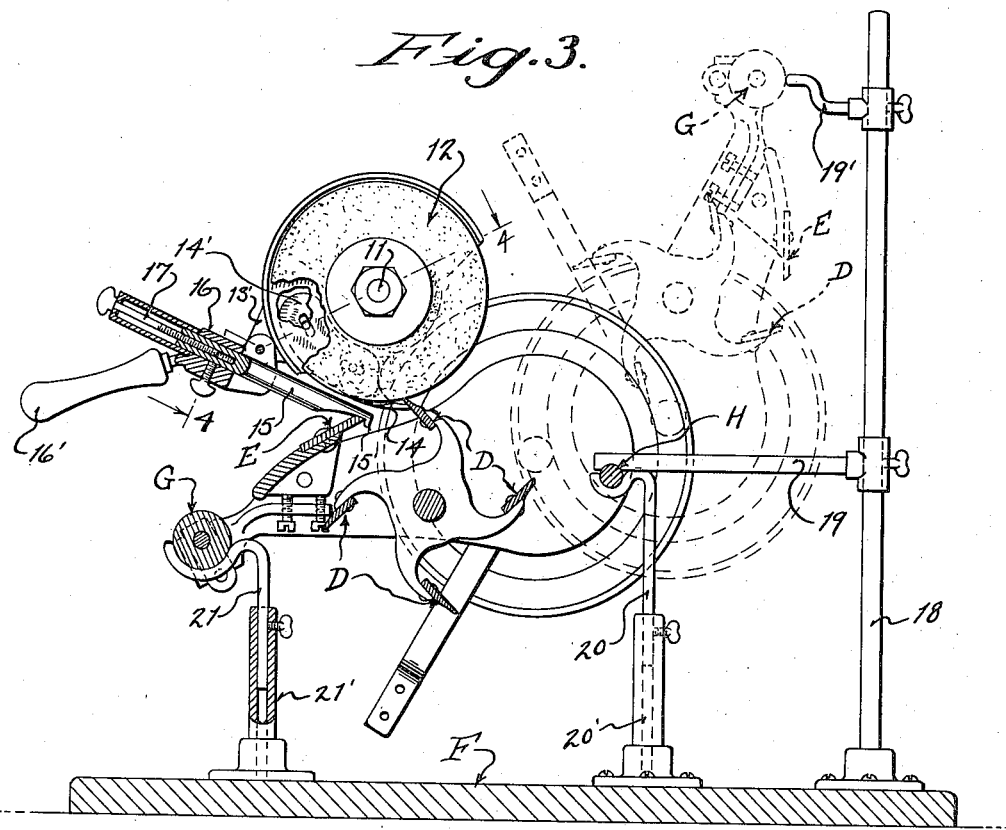
Figure 3 is a cross section of the machine, the section being indicated by lines 3—3 of Figures 1 and 2, particularly illustrating an inverted mower, in full lines, fitted to its bed supports for a sharpening operation.
Figure 4:
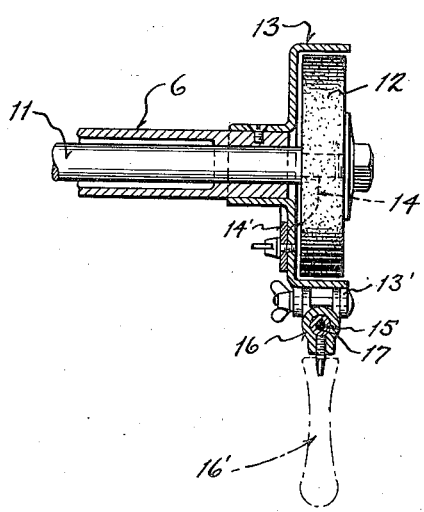
Figure 5:
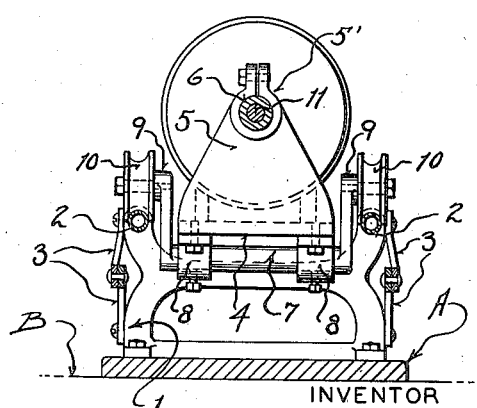

Figure 4 is a detailed longitudinal sectional view of the grinder wheel and associated parts, the section being indicated by line 4—4 of Figures 1 and 3. And Figure 5 is a cross sectional view through the motor carriage and associated parts, the section being indicated by line 5—5 of Figure 1.

Referring by characters to the drawings, A indicates a table, which may be mounted upon any suitable bed B, as indicated in Figure 1. The bed has secured to its ends upstanding companion brackets 1—1', which brackets, at their upper ends, have secured thereto a pair of tubular rails 2 in parallel relations. The brackets and rails are suitably braced from end to end by cross strips 3—3 connected at their centers and secured by screws to the brackets at their ends.

The rails are supplied for the support of a reciprocative carriage frame 4, the front end of which has upwardly extending therefrom an arm 5 terminating with a split collar 5' for clamping engagement with the breech end of a sleeve 6.

The carriage frame carries a yoke 7, fixedly secured to said carriage by a pair of clips 8 and set bolts. The yoke terminates with upwardly extended legs 9, for the reception of track rollers 10—10, it being noted that the track rollers are positioned just rearwardly of the carriage arm 5, whereby said carriage may be reciprocated, back and forth, upon the rails and also vertically oscillated with reference thereto.

Due to the arrangement of the carriage wheels and hanger yoke, it is apparent that said wheels may be adjusted slightly back and forth to insure a perfect balance between the sleeve and motor.

As noted in Figure 1 of the drawings, when the carriage is in its rearward position, the sleeve, which is rigidly mounted in the carriage arm, terminates at a point slightly beyond the front rail bracket 1'. Rigidly secured to the carriage bottom plate is an electric motor C, having its shaft 11 extending through and journaled in the sleeve 6. The end of the motor shaft projects beyond the sleeve and has secured thereto an abrasive wheel 12 of any desired quality.

The abrasive wheel is protected by a housing 13, which housing is rigidly secured to the end of the sleeve 6, that projects beyond and overhangs the carriage support. A coupling connection between the abrasive wheel and lawn mower, comprises a circumferentially adjustable finger 14 having a web 14' that is secured to the inner face of the housing.

As indicated in Figure 3 of the drawings, the finger 14 projects slightly beyond the periphery of the abrasive wheel and is adapted to engage the bottom surface of the spirally shaped mower blades D. A further guide for controlling the grinder wheel, comprises an adjustable rod 15, which rod terminates with a down-turned toothed end 15' for engagement with the edge of the shear blade E of the mower.

The opposite end of the rod 15 is adjustably mounted in a head casting 16, which casting is pivotally connected to an ear 13' of the housing 13. The toothed end rod 15 is adjustable in the head casting 16 by a spindle 17 mounted in a barrel portion of the housing and in threaded engagement with the end of said rod. The adjustment of the fingered end rod is for the purpose of regulating the grinder wheel contact with the blades, when said wheel may be reduced in circumference due to wear.

The handle 16' extends from the head casting 16 for the purpose of manipulating a grinding operation, whereby the grinding wheel, and associated parts, may be lifted and manually moved back and forth relative to the partially spiral mower knives.

While I have shown and specifically described manually controlled means for manipulating the grinder wheel, whereby it is moved back and forth and accurately guided in this movement, it is understood that I may vary the features of such mechanism without departing from the spirit of my invention, and substitute mechanism may be employed for the above mentioned purpose, within the knowledge of the skilled mechanic.

Referring now especially to means for adjustably supporting all standard types of lawn mowers, preparatory to the same being associated with my sharpening mechanism, I, preferably, provide a movable pad F, which is mounted forwardly of the rail frame upon the bed B. The pad has an upwardly extended standard 18, upon which is a vertically adjustable clamp-rod 19, and above the same is a vertically adjustable, guide roller rest pin 19'. Upon opposite sides of the standard 18 is a pair of stirrup rods 20 adjustably secured to socketed posts 20', which posts are secured to the pad F, as best indicated in Figures 1 and 3 of the drawings.

As best indicated in Figures 2 and 3 of the drawings, the support for the mower also includes a stirrup ended stem 21, which stem is adjustable in a socketed post 21', and the post may be positioned in any desired manner upon the pad F, for serving as a support, for the shear blade ground roller G of a mower, as clearly indicated in Figure 3.

From the foregoing description, when it is desired to sharpen the blades D of a standard mower, in practice, the handle is first removed from the mower and it is turned upside down and seated in the stirrup upside down with its guide roller G nested within the stirrup stem 21. The said mower is then fixedly anchored by its frame rod H, which is seated in the stirrup rod 21. This frame rod H is furthermore locked in its seat by the clamping-rod 19, as shown in Figure 3. Hence, when the mower is so positioned it can be approximately aligned with the sharpening wheel or, as indicated in dotted lines of Figure 3, it may be rocked backwardly and upwardly to the position shown, whereby it is supported about its pivot point by the pin 19', which pin will engage the mower guide roller. In this dotted position suitable inspection and repairs may be effected and also the mower may be properly oiled. In other words, the mower is not only sharpened, but it is also adjusted and tuned up to perform its cutting functions properly.

When the machine is in the position indicated in Figure 1, a sharpening stroke of the abrasive wheel has just been completed. To perform another stroke upon the blade of the mower, as is indicated in dotted lines, the operator tilts the counter-balanced carriage upwardly upon the rollers 10. This movement is effected by manually swinging the grinder means by the handle 16'. The operator then draws the grinder wheel forward and the carriage rides upon the rails 2. The grinder wheel is then tilted downwardly and engages a lawn mower blade at its forward end, and at the same time the tooth of the guide rod will engage the shear blade E of said mower.

In the above position the grinder mechanism is slowly moved backward, to repeat a sharpening operation of the blade, which blade will automatically slowly rotate to conform to its spiral twist, and the beveled cutting edge of said blade is ground by exerting downward pressure upon the handle to effect the cut. Thus the operation is repeated until all the blades are properly sharpened at the correct bevel, which bevel is determined by the adjustments of the finger 14 and guide tooth riding the edge of the shear blade.

While the sharpening machine has been particularly developed for grinding blades of lawn mowers, obviously it is capable of grinding the knives of various machines and, as for example, skates may be fitted to the supporting pad B for simple grinding.

I claim:

1. A grinding machine for lawn mowers or the like, comprising a table, a frame extending from the table, rails carried thereby, a carriage mounted between the rails, wheels journaled upon the carriage engaging said rails, an arm extended upwardly from the front of the carriage, a sleeve secured to the arm and extending forwardly therefrom, a motor mounted upon the carriage rearwardly of the wheels, a motor driven shaft journaled in the sleeve and extending beyond the same, a grinder wheel secured to the extended end of said shaft, a housing partly encasing the grinder wheel extending from the sleeve, an adjustable guide means carried by the housing adapted to engage the shear blade and knife blade of a lawn mower, and means for supporting a lawn mower beyond the rails and in approximate alignment with the aforesaid grinder wheel.

2. A grinding machine for lawn mowers or the like comprising a carriage, an arm extending upwardly therefrom, a motor mounted upon the carriage rearwardly of the arm, a table, rails carried thereby, an overhanging sleeve secured to the carriage arm, a motor driven shaft journaled in the sleeve, a yoke pivoted to the carriage, a grinder wheel secured to the outer end of the shaft, and a pair of supporting wheels mounted upon the yoke engageable with the rails, the same being positioned between the motor and sleeve, whereby the grinder wheel may be moved back and forth upon the track and raised or lowered upon the carriage wheels, the said grinder wheel and overhung sleeve being counter balanced upon the carriage wheels by the weight of the motor positioned rearwardly of said carriage wheels.

EDWARD J. TOEPFER.

REFERENCES CITED

The following references are of record in the file of this patent:

UNITED STATES PATENTS

| Number | Name | Date |
|---|---|---|
| 1,271,837 | Bille | July 9, 1918 |
| 1,605,890 | Brown | Nov. 2, 1926 |
| 2,244,586 | Venable | June 3, 1941 |
| 2,279,798 | Shelburne | Apr. 14, 1942 |
| 2,281,055 | Smith | Apr. 28, 1942 |
| 2,377,126 | Brown | May 29, 1945 |